United States Patent
Tang et al.

(10) Patent No.: US 8,600,308 B2
(45) Date of Patent: Dec. 3, 2013

(54) CHANNEL STATE INFORMATION FEEDBACK FOR COORDINATED MULTIPLE POINTS TRANSMISSION

(75) Inventors: Yang Tang, San Diego, CA (US); Pengfei Xia, San Diego, CA (US); Zhigang Rong, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 834 days.

(21) Appl. No.: 12/817,003

(22) Filed: Jun. 16, 2010

(65) Prior Publication Data

US 2010/0322351 A1    Dec. 23, 2010

Related U.S. Application Data

(60) Provisional application No. 61/187,967, filed on Jun. 17, 2009, provisional application No. 61/248,533, filed on Oct. 5, 2009.

(51) Int. Cl.
| H04B 17/00 | (2006.01) |
| H04B 1/00 | (2006.01) |
| H04B 7/00 | (2006.01) |
| H04B 7/02 | (2006.01) |
| H04L 27/00 | (2006.01) |
| H04L 27/28 | (2006.01) |
| H04L 1/02 | (2006.01) |
| H04K 1/10 | (2006.01) |

(52) U.S. Cl.
USPC .......... 455/67.11; 455/69; 455/500; 455/524; 375/259; 375/260; 375/267

(58) Field of Classification Search
USPC ........................................... 455/67.11
See application file for complete search history.

(56) References Cited

U.S. PATENT DOCUMENTS

| 6,233,433 B1 | 5/2001 | Norin | |
| 2008/0310523 A1* | 12/2008 | Hui et al. | 375/260 |
| 2010/0027456 A1* | 2/2010 | Onggosanusi et al. | 370/312 |
| 2010/0239036 A1* | 9/2010 | Koo et al. | 375/260 |

FOREIGN PATENT DOCUMENTS

| CN | 101282564 A | 10/2008 |
| CN | 101340219 A | 1/2009 |
| WO | WO 2007/117468 A2 | 10/2007 |

OTHER PUBLICATIONS

International Search Report and Written Opinion of the International Searching Authority and Translation received in Patent Cooperation Treaty Application No. PCT/CN2010/074013, mailed Sep. 23, 2010, 11 pages.

(Continued)

*Primary Examiner* — Temesgh Ghebretinsae
*Assistant Examiner* — Devan Sandiford
(74) *Attorney, Agent, or Firm* — Slater & Matsil, L.L.P.

(57) ABSTRACT

In accordance with an embodiment of the present invention, a method for providing wireless communication system includes receiving a reference signal from each base station of a plurality of base stations serving a mobile station. The received reference signals are measured to compute a single cell feedback matrix and a combining matrix for each channel between the plurality of base stations and the mobile station. A channel state information is generated having information about the combining and the single cell feedback matrices. The channel state information is transmitted to the plurality of base stations.

30 Claims, 9 Drawing Sheets

(56) References Cited

OTHER PUBLICATIONS

Astely, D., et al., "LTE: The Evolution of Mobile Broadband," LTE Part II: 3GPP Release 8, IEEE Communications Magazine, Apr. 2009, pp. 44-51.

Gesbert, D., et al., "From Theory to Practice: An Overview of MIMO Space-Time Coded Wireless Systems," IEEE Journal of Selected Areas in Communications, vol. 21, No. 3, Apr. 2003, pp. 281-302.

Parkvall, S., et al., "LTE-Advanced—Evolving LTE towards IMT-Advanced," IEEE, 2008, pp. 1-5.

* cited by examiner

CHANNEL STATE INFORMATION FEEDBACK FOR COORDINATED MULTIPLE POINTS TRANSMISSION

This application claims the benefit of U.S. Provisional Application No. 61/187,967, filed on Jun. 17, 2009, entitled "Composite of Single Cell Channel State Information Feedback for Coordinated Multiple Points Transmission," and U.S. Provisional Application No. 61/248,533, filed on Oct. 5, 2009, entitled "Adaptive Composite of Single Cell Channel State Information Feedback for Coordinated Multiple Points Transmission," which applications are hereby incorporated herein by reference.

TECHNICAL FIELD

The present invention relates generally to coordinate multiple points transmission, and, in particular embodiments, to channel state information feedback for coordinated multiple points transmission.

BACKGROUND

Coordinated multi-point (CoMP) transmission and reception is considered for Long Term Evolution-Advanced (LTE-A) as the solution to improve the coverage of high data rate, the cell-edge throughput and/or to increase system throughput. In coordinated multi-point (CoMP) transmission, transmissions from multiple transmitter are made simultaneously to a single receiver. Coordination of the multiple transmissions made by the multiple transmitters enable the receiver to combine the transmissions to improve data rate coverage and to increase system throughput in advanced wireless communications systems, such as Long Term Evolution-Advanced (LTE-A).

In the uplink (UL) direction, a mobile station (MS) transmits data to a base station (BS). Uplink coordinated multi-point reception implies reception of the MS's transmitted signals at multiple geographically separated or co-located points e.g. a single MS transmitting to multiple BSs. BS is also commonly referred to as base transceiver station, controller, evolved NodeB (eNB), access point (AP), access network (AN), and so forth, while a BS may also be commonly referred to as user equipment (UE), access terminal (AT), subscribers, subscriber stations, terminals, mobile stations, and so on.

In the downlink (DL) direction where the BS transmits data to the MS, downlink coordinated multi-point transmission implies dynamic coordination among multiple geographically separated transmission points. Examples of downlink coordinated transmission schemes include coordinated beamforming where the data to a single MS is instantaneously transmitted from one of the transmission points and the scheduling decisions are coordinated to control e.g. the interference generated in a set of coordinated cells. In coordinated scheduling and coordinated beamforming, the data may only be available at a serving BS and transmission scheduling is coordinated among BSs within the CoMP cooperating set.

Joint processing/transmission is another example of downlink coordinated transmission scheme with more advanced interference mitigation capability where the data to a single MS is simultaneously transmitted from multiple transmission points, e.g. to (coherently or non-coherently) improve the received signal quality and/or cancel actively interference for other MSs. Downlink coordinated multi-point transmission includes the possibility of coordination between different cells. From a radio-interface perspective, there is no difference from the MS perspective if the cells belong to the same BS or different BS. If inter-BS coordination is supported, information needs to be signaled between BS.

In joint processing, there is an assumption that data is available at each transmission point (BS) in a CoMP cooperating set representing BSs participating in the CoMP transmission. The data may be transmitted from more than one BS at a time with dynamic BS selection when the data is transmitted.

SUMMARY OF THE INVENTION

In accordance with an embodiment of the present invention, a method for providing wireless communication system comprises receiving a reference signal from each base station of a plurality of base stations serving a mobile station. The received reference signals are measured to compute a single cell feedback matrix and a combining matrix for each channel between the plurality of base stations and the mobile station. Channel state information is generated having information about the combining and the single cell feedback matrices. The channel state information is transmitted to the plurality of base stations.

In accordance with another embodiment of the present invention, a communications device comprises a receiver configured to receive reference signals from a plurality of bases stations. The communications device further comprises a channel estimate unit, a feedback unit, and a channel state information generation unit. The channel estimate unit is configured to measure the received reference signals. The feedback unit is configured to compute a single cell feedback matrix and a combining matrix $W_i$ for each channel between the base stations and the communication device. The channel state information generation unit is configured to generate a channel state information having information about the combining and the single cell feedback matrices. The communications device also includes a transmitter configured to transmit the channel state information to the plurality of base stations.

In another embodiment, a communication device comprises a receiver configured to receive channel state information comprising a single cell feedback matrix and a combining matrix. The communication device includes a precoder computer unit configured to compute a CoMP channel precoding matrix for a coordinated multi-point transmission from the single cell feedback matrix and a combining matrix. The communication device further comprises a transmitter configured to transmit a CoMP transmission with data precoded using the CoMP channel precoding matrix.

BRIEF DESCRIPTION OF THE DRAWINGS

For a more complete understanding of the present invention, and the advantages thereof, reference is now made to the following descriptions taken in conjunction with the accompanying drawing, in which:

FIG. 2, which includes FIGS. 2a and 2b, illustrates a wireless communication system and its operation in accordance with embodiments of the invention, wherein FIG. 2a illustrates the wireless communication system and wherein FIG. 2b illustrates its operations;

DETAILED DESCRIPTION OF ILLUSTRATIVE EMBODIMENTS

The making and using of various embodiments of the present invention are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Multiple-input multiple-output (MIMO) technology exploits the spatial components of the wireless channel to provide capacity gain and increased link robustness. MIMO is often combined with OFDM (orthogonal frequency division multiplexing), a type of digital modulation that makes it easy to equalize broadband channels.

In MIMO communication systems, at the transmitter, data are modulated, encoded, and mapped onto spatial signals, which are transmitted from the multiple transmit antennas. A main difference with non-MIMO communication systems is that there are many different spatial formatting modes for example beamforming, precoding, spatial multiplexing, space-time coding, and limited feedback precoding, among others. The spatial formatting techniques have different performance (in terms of capacity, achievable rate, or bit error rate for example) in different channel environments. Consequently, the spatial transmission mode of a MIMO channel is adapted based on information obtained about the channel.

One especially effective technique is known as closed-loop MIMO communication, where channel state information or other channel-dependent information is provided from the receiver to the transmitter through a feedback link. This information is used to customize the transmitted signal to the current propagation conditions to improve capacity, increase diversity, reduce the deleterious effects of fading, or support more users in the communication link for example.

In conventional single cell MIMO, a single base station communicates with a mobile station. Coordinated multiple points (CoMP) transmission improves upon conventional single cell MIMO performance. Unlike single cell MIMO, in CoMP, multiple base stations communicate with a mobile station.

Figure 1:
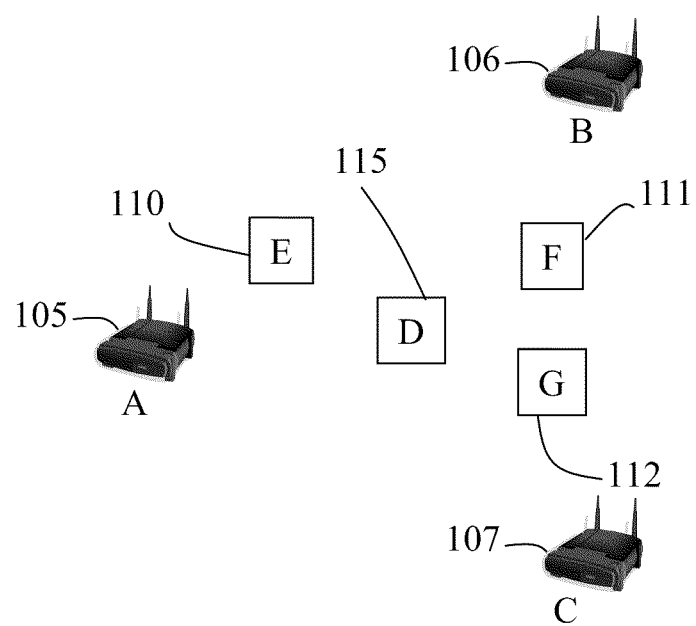
FIG. 1 illustrates a wireless communications system using single cell MIMO and CoMP in accordance with embodiments of the invention.

FIG. 1 illustrates a wireless communications system using single cell MIMO and CoMP in accordance with embodiments of the invention. Wireless communications system 100 includes base stations, such as BS A 105, BS B 106, and BS C 107. Each BS may control communications within a certain area such as cells A, B, and C. Wireless communications system 100 also includes mobile stations such as MS E 110, MS F 111, and MS G 112, with MS E 110 operating in a cell controlled by BS A 105 (cell A), MS F 111 operating in a cell controlled by BS B 106 (cell B), and MS G 112 operating in a cell controlled by BS C 107 (cell C). Further, in various embodiments, the number of BSs serving a MS may be more than three.

Cooperative multi-point (CoMP) transmission and reception is most effective to MS that are located at or near boundaries of cells A, B, and C. In various embodiments, joint processing and data sharing across cells A, B, and C may be used for MS D 115 as well as MS E 110, MS F 111, and MS G 112 located within each cell.

In order to further help achieve better channel utilization and increase overall system performance, channel state/statistics/information about a downlink (DL) channel(s) between a BS and a MS must be provided by the MS to the BS. The channel state/statistics/information provided by the MS enables the BS to adjust its transmitter to more effectively make use of the DL channel(s) condition.

One of the challenges in coordinated multi-point (CoMP) transmission involves providing channel state information or other channel-dependent information to each BS without significantly increasing the feedback overhead for the MS.

In various embodiments of the invention, a method is disclosed to compose a new form of CSI, which can be directly used by the BS set serving the MS for CoMP transmissions, based on the single cell CSI feedback. By doing so, not only can the feedback overhead be reduced, but also transparent mode adaptation between single cell and CoMP transmission can be achieved. In addition, the proposed embodiments can avoid CSI sharing within the serving base station (BS) set, such that the backhaul traffic load can be significantly reduced.

The present invention will now be described in the context of specific examples. The scope of the invention, however, is not limited to the specific embodiments.

Various methods to compose the CSI for CoMP based on single cell CSI feedback will be described using FIGS. 2-5, along with the descriptions below in accordance to embodiments of the inventions. These techniques can be used in the application of MIMO-based air interface technologies.

Figure 2A:
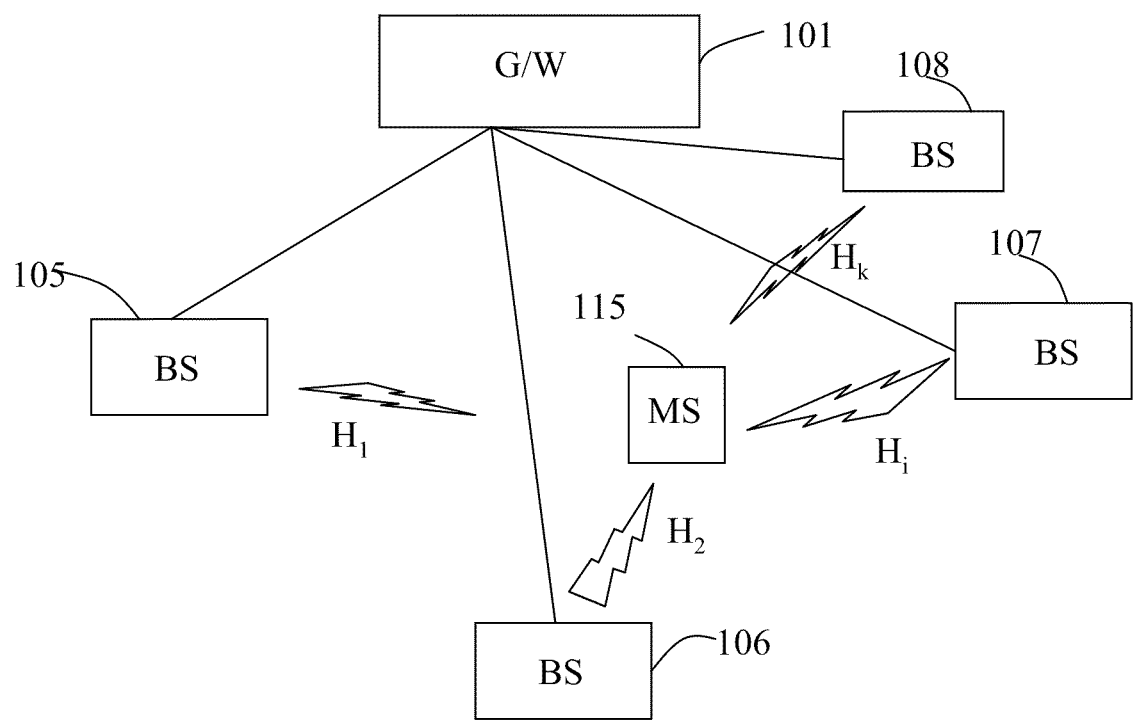
Figure 2B:
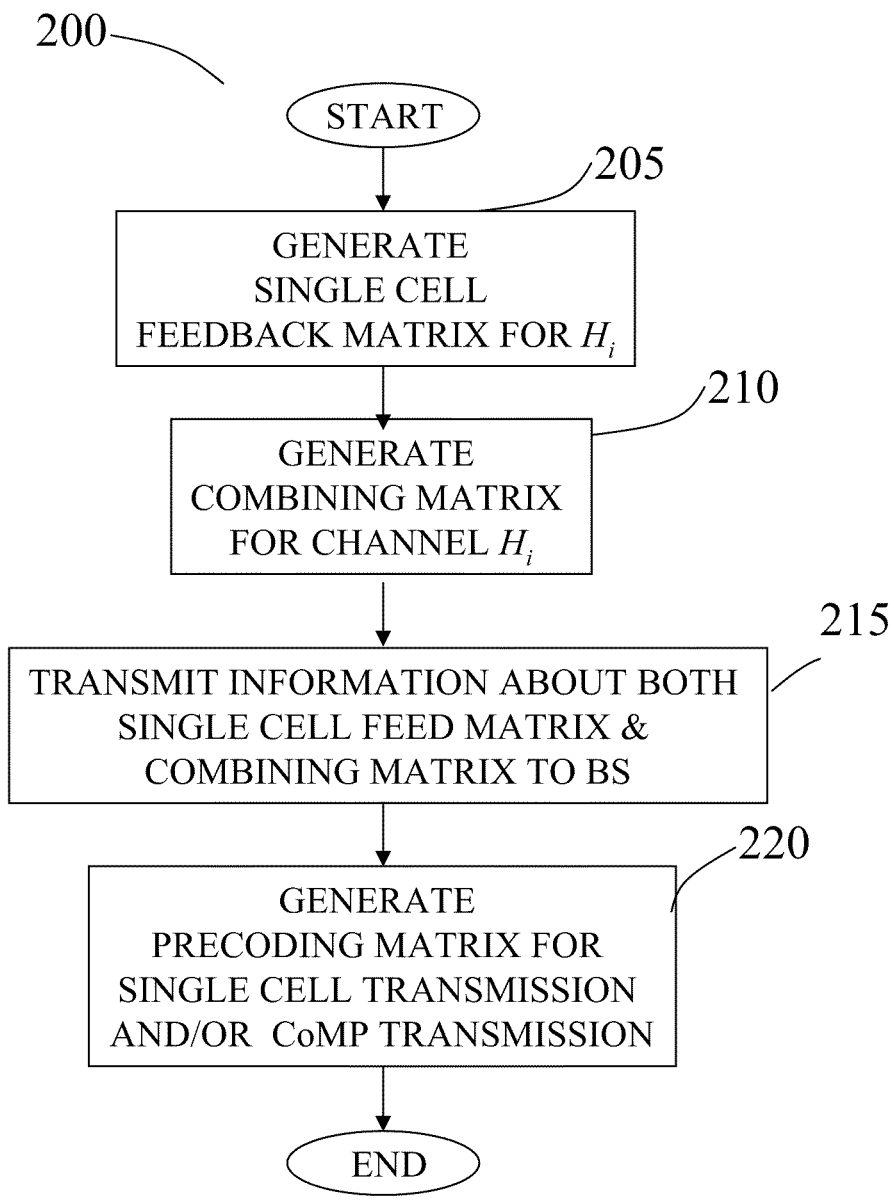

FIG. 2, which includes FIGS. 2a and 2b, illustrates a wireless communication system and its operation in accordance with embodiments of the invention, wherein FIG. 2a illustrates the wireless communication system and wherein FIG. 2b illustrates its operations.

FIG. 2 illustrates a communications system 100, wherein a plurality of BSs serve a single MS using CoMP transmission. Communications system 100 includes a number of BSs, such as BS 105, BS 106, BS 107, and BS 108 that may be connected to a gateway (G/W) 101 over a wired backhaul. The BSs may serve a number of MSs, such as the MS 115. Transmissions from the BSs to the MSs may occur directly, such as from BS 105 to MS 110, or indirectly, such as through a relay node (RN) (not shown).

Compared to the single cell MIMO, CoMP requires the mobile terminal, such as MS D 115, to feed much more and different forms of the channel state information (CSI) back to more than one base stations, such as BS 105, BS 106, BS 107, and BS 108. This is because in coordinated multi-point (CoMP) transmission, multiple channels, such as H1, H2, H3, and H4, exist between each of the transmitters (base station BS) and the receiver (mobile station MS).

For the following description, the number of base stations serving a particular MS is generalized by a number K of base stations (BS's), which is total number of BS serving the MS and therefore the BS set for the mobile station (MS).

Under single cell MIMO, the received signal Y, at each MS from the i-th BS is represented as:

$$Y_i = H_i X_i + No_i,$$

where $H_i$ is a $N_r \times N_{ti}$ matrix observed by the signal in the wireless medium, $i \in [1, \ldots, K]$ represents the particular downlink (DL) channel between the i-th BS and the MS, where $N_{ti}$ is the number of transmit antennas at i-th BS and $N_r$ is the number of receive antennas at the MS, $X_i$ is the signal, such as pilot or reference signal, transmitted by the i-th BS, and $No_i$ is the channel noise.

In conventional CoMP, a separate feed back is provided for single cell MIMO channel and the CoMP channel. However such a practice results in not favored due to the increased feedback overhead as well as the increase in complexity at the MSs.

In one embodiment, each downlink channel matrix $H_i$ is decomposed using singular value decomposition (SVD) such that $H_i$ is given as $H_i = U_i D_i V_i^H$, where $U_i$ is a matrix of eigenvectors for the downlink channel, $D_i$ is a diagonal matrix of singular values for the downlink channel, where $U_i$ and $D_i$ are $N_r \times N_r$ matrices and $V_i$ is a $N_{ti} \times N_r$ unitary matrix. In particular, $V_i$ is the only required CSI at the i-th BS for single cell closed-loop MIMO (CL-MIMO).

In joint processing/transmission based CoMP, the equivalent channel, which takes all serving BS's into consideration, is denoted by a $N_r \times N_t$ matrix H, where $N_t$ is the total number of transmit antennas in the serving BS set and therefore $$N_t = \sum_{i=1}^{K} N_{ti}.$$

With SVD, the CoMP downlink channel matrix H is given by $H = [H_1, H_2, \ldots, H_K] = UDV^H$, in which U and D are $N_r \times N_r$ matrices and V is a $N_r \times N_r$ unitary matrix and represents an optimum precoding matrix for CoMP. The columns of matrix V are the CSI required in joint processing/transmission based CoMP for a base station to transmit to a mobile station.

One way to accomplish this is if the MS transmits both CoMP downlink precoding matrix V and single cell closed-loop MIMO precoding matrix $V_i$ for the channel between the i-th base station and the mobile station. Then the base station can select the appropriate precoding matrix depending on whether a single cell closed-loop MIMO or a joint processing/transmission based CoMP is being transmitted. However, this introduces a large feedback overhead which is avoided by embodiments of the invention.

In various embodiments, the CSI used for CoMP is derived from the single cell CSI feedback. A method to compose the single cell CSI feedback into the CSI used for CoMP will now be described in accordance with an embodiment. In various embodiments, the columns of matrix CoMP feedback matrix V are obtained based on the single cell feedback matrix $V_i$, $i \in [1, \ldots, K]$ at the base station.

FIG. 2b illustrates operations 200 within a wireless communications system in accordance with embodiments of the invention. A MS generates the single cell feedback matrix $V_i$ (block 205). The MS derives a combining matrix $W_i$ corresponding to the channel $H_i$, $i \in [1, \ldots, K]$ (block 210). The MS sends both the combining matrix $W_i$ and the single cell CSI feedback matrix $V_i$ (or part of columns of $V_i$) to the i-th BS (block 215). In various embodiments, the MS may send the combining matrix for each single cell channel to a serving BS. The serving BS may provide each BS in the BS set the corresponding combining matrix $W_i$ and the single cell CSI feedback matrix $V_i$ for that i-th BS. Alternatively, in other embodiments, the MS may transmit each BS, a particular combining matrix $W_i$ and the single cell CSI feedback matrix $V_i$. For example, the MS sends $V_1$ and $W_1$ to the first BS, $V_2$ and $W_2$ to the second BS.

Subsequently, at the i-th BS, the CoMP channel precoding matrix V (or part of columns of the CoMP channel precoding matrix V) is approximated by a composite CSI feedback matrix $\hat{V}$ (block 220), which is given as $\hat{V} = [V_1 W_1; V_2 W_2; \ldots; V_K W_K]$. In various embodiments, the CoMP channel precoding matrix is approximated by the composite CSI feedback matrix $\hat{V}$ and is therefore a composite of various single cell feedback $V_i$.

A method to derive the combining matrix $W_i$ is now described in accordance with an embodiment of the invention. The channel matrix $H_i$, $i \in [1, \ldots, K]$ is left multiplied with matrix $U^H$ and transformed into a new matrix, denoted by $\tilde{H}_i$ and given as $\tilde{H}_i = U^H H_i$. $U^H$ is the conjugate transpose of the unitary matrix U obtained after SVD of the CoMP downlink channel matrix H between the base stations and the mobile station.

Again $\tilde{H}_i$ can be decomposed using SVD as $\tilde{H}_i = \tilde{U}_i \tilde{D}_i \tilde{V}_i^H$, where $\tilde{U}_i$ and $\tilde{D}_i$ are $N_r \times N_r$ matrices and $\tilde{V}_i$ is a $N_{ti} \times N_r$ unitary matrix and they are obtained through SVD of $\tilde{H}_i$. In various embodiments, the combining matrix $W_i$ is defined as $W_i^H = \tilde{U}_i \tilde{D}_i$, so that $\tilde{H}_i = \tilde{U}_i \tilde{D}_i \tilde{V}_i^H = W_i^H \tilde{V}_i^H$. Because $\tilde{H}_i$ is also defined to be equal to $U^H H_i$, $W_i^H \tilde{V}_i^H = U^H H_i$.

$\tilde{V}_i$ is the phase rotated version of matrix $V_i$, and is therefore given as $\tilde{V}_i = V_i R_i$, where $R_i$ is a diagonal matrix. Consequently, for single cell MIMO, taking either $\tilde{V}_i$ or $V_i$ as the precoder will end up with identical performance in terms of throughput.

Because $W_i^H$ was defined as $\tilde{U}_i \tilde{D}_i$ the translated CoMP channel $\tilde{H}$ becomes $$[W_1^H \tilde{V}_1^H, W_2^H \tilde{V}_2^H, \ldots, W_K^H \tilde{V}_K^H] = [U^H H_1, U^H H_2, \ldots, U^H H_K] = U^H H = DV^H$$

As a result, we have $$\mathrm{norm}([W_1^H \tilde{V}_1^H, W_2^H \tilde{V}_2^H, \ldots, W_K^H \tilde{V}_K^H]) = \mathrm{norm}(DV^H) = V^H$$

where norm( ) denotes the operation of per row normalization. Thus, a BS receiving the combining matrix W and the single channel effective (phase rotated) precoding matrix $\tilde{V}_i$ from a MS can calculate the precoding matrix V for the CoMP channel.

In particular, the beamforming information at the i-th BS can be obtained by defining V (:,n) as the n-th column of V, a base station can recover the n-th column of V as:

$$\mathrm{norm}([W_1(:,n)^H \tilde{V}_1^H, W_2(:,n)^H \tilde{V}_2^H, \ldots, W_K(:,n)^H \tilde{V}_K^H]) = V(:,n)^H.$$

The recovered V (:,n) of the CoMP channel precoding matrix can be used for beamforming in subsequent transmission to the MS.

A simplified combining matrix $W_i$ is next described in accordance with an embodiment of the invention. In one embodiment, the combining matrix is depicted in a matrix form as $$W_i^H = \tilde{U}_i \tilde{D}_i = [\tilde{u}_{i1}, \tilde{u}_{i2}, \ldots, \tilde{u}_{iN_r}] \times \begin{bmatrix} \lambda_{i1} & 0 & \ldots & 0 \\ 0 & \lambda_{i2} & \ldots & 0 \\ \vdots & \vdots & \ddots & \vdots \\ 0 & 0 & \ldots & \lambda_{iN_r} \end{bmatrix}$$

where $\tilde{u}_{ij}$, $j \in [1, \ldots, N_r]$ is the j-th column vector of $\tilde{U}_i$ and $\lambda_{ij}$, $j \in [1, \ldots, N_r]$ is the corresponding j-th singular value of $H_i$ and these singular values have been arranged in a non-increasing order.

With a correlated MIMO channel, it is reasonable to assume that $$\sum_{j=1}^{m_i} \lambda_{ij} \gg \sum_{j=m_i+1}^{N_r} \lambda_{ij}.$$

In this case, the matrix $W_i^H$ can be approximated by a $N_r \times m_i$ matrix $\tilde{W}_i^H$ to eliminate singular values having less impact. Hence, only a part of the singular values are used thereby reducing the rank of the matrix $\tilde{W}_i^H$. In various embodiments, in case of correlated MIMO channels, the MS can adjust the feed back based on each channel and reduce the rank for some BSs. For example, no feed back may be provided if some BS are very weak (i.e. $m_i=0$).

Therefore, a $N_r \times m_i$ matrix $\tilde{W}_i^H$ is defined as $$\tilde{W}_i^H = [\tilde{u}_{i1}, \tilde{u}_{i2}, \ldots, \tilde{u}_{im_i}] \times \begin{bmatrix} \lambda_{i1} & 0 & \ldots & 0 \\ 0 & \lambda_{i2} & \ldots & 0 \\ \vdots & \vdots & \ddots & \vdots \\ 0 & 0 & \ldots & \lambda_{im_i} \end{bmatrix} = W_i(1:m_i, :)^H$$

where $m_i \in [1, \ldots, N_r]$.

As a result, the base station receiving the combining matrix and the single cell feedback matrix can recover a nth column of the approximated CoMP precoding matrix V (:,n) as:

$$V(:,n)^H \approx \text{norm}([W_1(1:m_1,n)^H V_1(:,1:m_1)^H, W_2(1m_2,n)^H V_2(:,1:m_2)^H, \ldots, W_K(1:m_K,n)^H V_K(:,1:m_K)^H]).$$

The CoMP precoding matrix V(:,n) thus recovered at the base station can be used in subsequent transmission to the MS.

Figure 3:
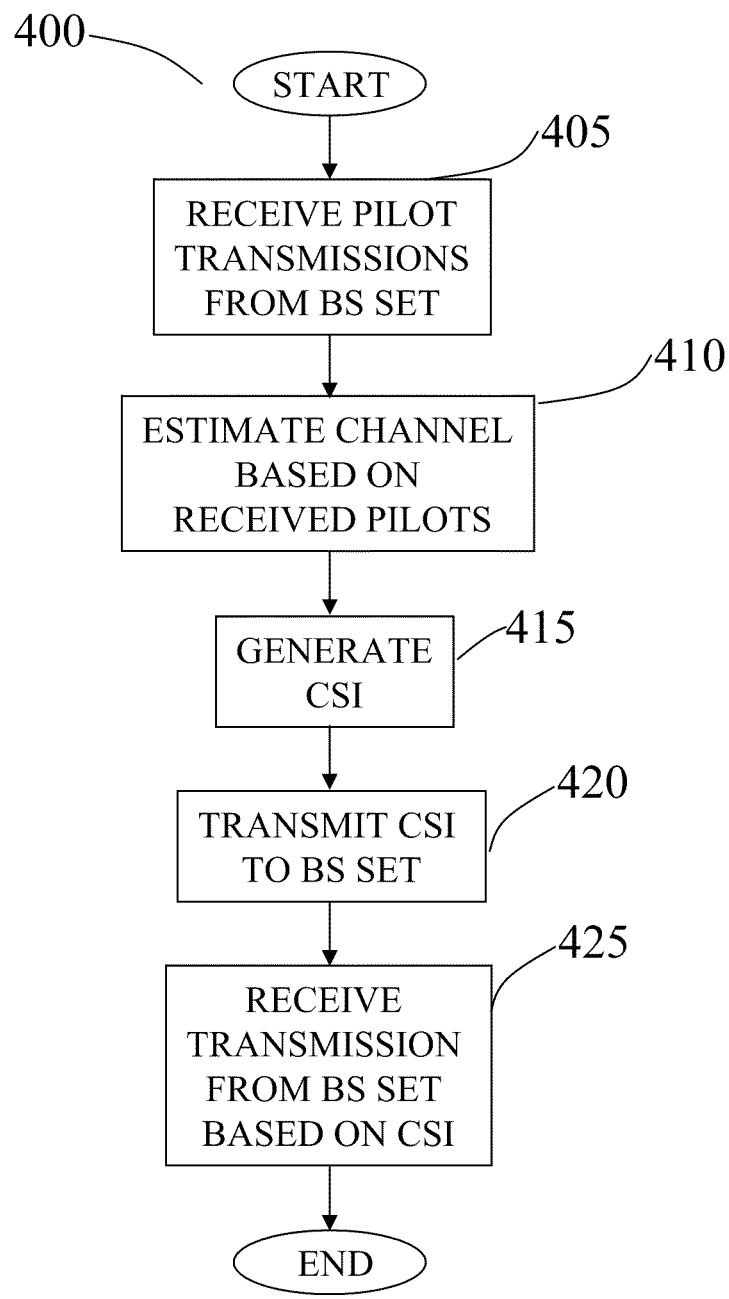
FIG. 3 illustrates a flow diagram of MS operations in providing feedback information to a BS for a CoMP communication in accordance with embodiments of the invention.

FIG. 3 illustrates a flow diagram of MS operations 400 in providing feedback information to a BS for a CoMP communication in accordance with embodiments of the invention. MS operations 400 may be indicative of operations occurring in a MS, such as MS 110, MS 111, MS 112, or MS 115 in FIG. 1, and a BS set, such as BS 105, BS 106, and BS 107, participating in CoMP communication. MS operations 400 may occur while the MS is in a normal operating mode and while the MS and the BS continue to communicate using CoMP.

MS operations 400 may begin with the MS receiving pilot signals from each of the BS in the BS set serving the MS (block 405). In general, the pilot signal may be a special sequence transmitted by each of the BS intended for use by MS in measuring a communications channel between the BS and the MS, i.e., the downlink channel. In an alternative embodiment, instead of the pilot, the BS set may also transmit a reference sequence.

The MS may then estimate the downlink channel between each of the BS in the BS set serving the MS and the MS using the received pilot (block 410). The MS may use any of a variety of techniques to measure the downlink channel using the pilot. In an alternative embodiment, instead of estimating the downlink channel using the received pilot, the MS may make use of the received reference signal. In yet another alternative embodiment, the BS may not transmit a pilot or a reference signal. Instead, the MS may use regular transmissions made by the BS overtime to estimate the downlink channel.

From the estimate of the downlink channel, the MS may compute the single cell CSI feedback matrix $V_i$ for an i-th downlink channel between an i-th base station of the plurality of base stations and the mobile station and the combining matrix $W_i$ as described in various embodiments above.

Therefore, in one embodiment, the MS determines the combining matrix by computing $W_i^H$ such that $$W_i^H = \tilde{U}_i \tilde{D}_i = [\tilde{u}_{i1}, \tilde{u}_{i2}, \ldots, \tilde{u}_{iN_r}] \times \begin{bmatrix} \lambda_{i1} & 0 & \ldots & 0 \\ 0 & \lambda_{i2} & \ldots & 0 \\ \vdots & \vdots & \ddots & \vdots \\ 0 & 0 & \ldots & \lambda_{iN_r} \end{bmatrix}.$$

In another embodiment, the MS determines the combining matrix by computing $W_i^H$ such that $$W_i^H = [\tilde{u}_{i1}, \tilde{u}_{i2}, \ldots, \tilde{u}_{im_i}] \times \begin{bmatrix} \lambda_{i1} & 0 & \ldots & 0 \\ 0 & \lambda_{i2} & \ldots & 0 \\ \vdots & \vdots & \ddots & \vdots \\ 0 & 0 & \ldots & \lambda_{im_i} \end{bmatrix} = W_i(1:m_i, :)^H,$$

wherein $m_i \in [1, \ldots, N_r]$, and wherein $N_r$ is the number of antennas on the mobile station.

The MS then generates a CSI information that includes information of the computed feedback matrices (block 415). The MS then feedbacks the generated CSI to the BS set (block 420). The MS receives a new transmission from the BS set based on the CSI feedback to the BS set (block 425).

Figure 4:
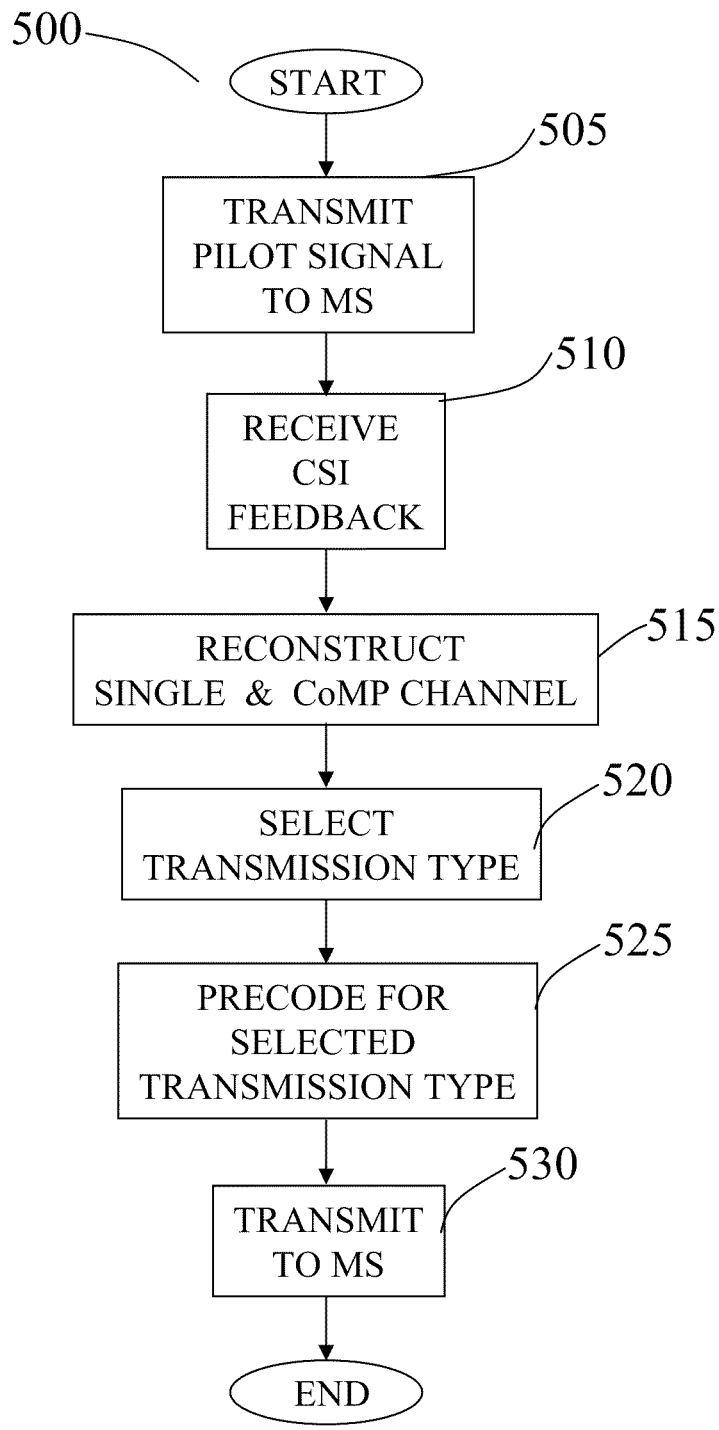
FIG. 4 illustrates a flow diagram of BS operations of a BS set serving a MS using CoMP communications in accordance with embodiments of the invention.

FIG. 4 illustrates a flow diagram of BS operations 500 of a BS set serving a MS using CoMP communications in accordance with embodiments of the invention. BS operations 500 may be indicative of operations occurring in a BS, such as BS 105 in FIG. 1 or 2, as the BS and a MS operating within its coverage area, such as MS 115 in FIG. 1 or 2 among others. BS operations 500 may occur while the BS is in a normal operating mode and while the BS and the MSs continue to communicate using CoMP.

BS operations 500 may begin with the BS transmitting a pilot signal (block 505). The pilot signal may or may not itself be part of a CoMP transmission. Usually, the pilot signal may be a special sequence transmitted by the BS intended for use by the MSs operating within its coverage area to measure a downlink channel between the BS and each of the respective MSs. The measurement of the downlink channel may then be used to compute an estimate of the downlink channel and then determine channel state information feedback. According to an alternative embodiment, instead of transmitting the pilot, the BS may transmit a reference signal. According to another alternative embodiment, the BS does not transmit a special signal or sequence. Instead, normal transmissions by the BS may be used by the respective MSs to measure the downlink channel.

After transmitting the pilot, the BS may receive channel information feedback from the MSs operating within its coverage area (block 510). The BS may receive single cell feedback matrix $V_i$ and a combining matrix $W_i$ in various embodiments described. The BS may then reconstruct the single cell feedback matrix $V_i$ and a combining matrix $W_i$ from the CSI, example, removing error decoding etc (block 515).

The BS selects a transmission mode (CoMP or conventional single cell MIMO) for the next transmission to the BS (block 520). This may be communicated to the BS by a gateway in some embodiments.

The data to be transmitted is precoded based on the channel feedback information (block 525). If the transmission mode is CoMP, the BS uses the single cell feedback matrix $V_i$ and the combining matrix $W_i$ to generate the CoMP channel precoding matrix V as described in various embodiments above.

Therefore, as described in detail above, in one embodiment, the BS computes the beamforming vector $V(:,n)$ for the CoMP as $$\mathrm{norm}([W_1(:,n)^H \tilde{V}_1^H, W_2(:,n)^H \tilde{V}_2^H, \ldots, W_K(:,n)^H \tilde{V}_K^H])$$
$$= V(:,n)^H.$$

In another embodiment, the BS computes the beamforming vector $V(:,n)$ for the CoMP as $$V(:,n)^H \approx \mathrm{norm}([W_1(1:m_1,n)^H V_1(:,1:m_1)^H, W_2(1:m_2,n)^H V_2(:,1:m_2)^H, \ldots, W_K(1:m_K,n)^H V_K(:,1:m_K)^H]).$$

Alternatively, if the transmission mode is single cell MIMO, the BS uses the single cell feedback matrix $V_i$ for the precoding. The precoded symbol is transmitted to the MS (block 530).

An alternative embodiment of the invention will now be described using an adaptive codebook design for channel state feedback.

In this embodiment, the combining matrix is defined as a unitary matrix. Therefore, instead of sending the combining matrix, a codebook can be used and the combining matrix is quantized.

Figure 5:
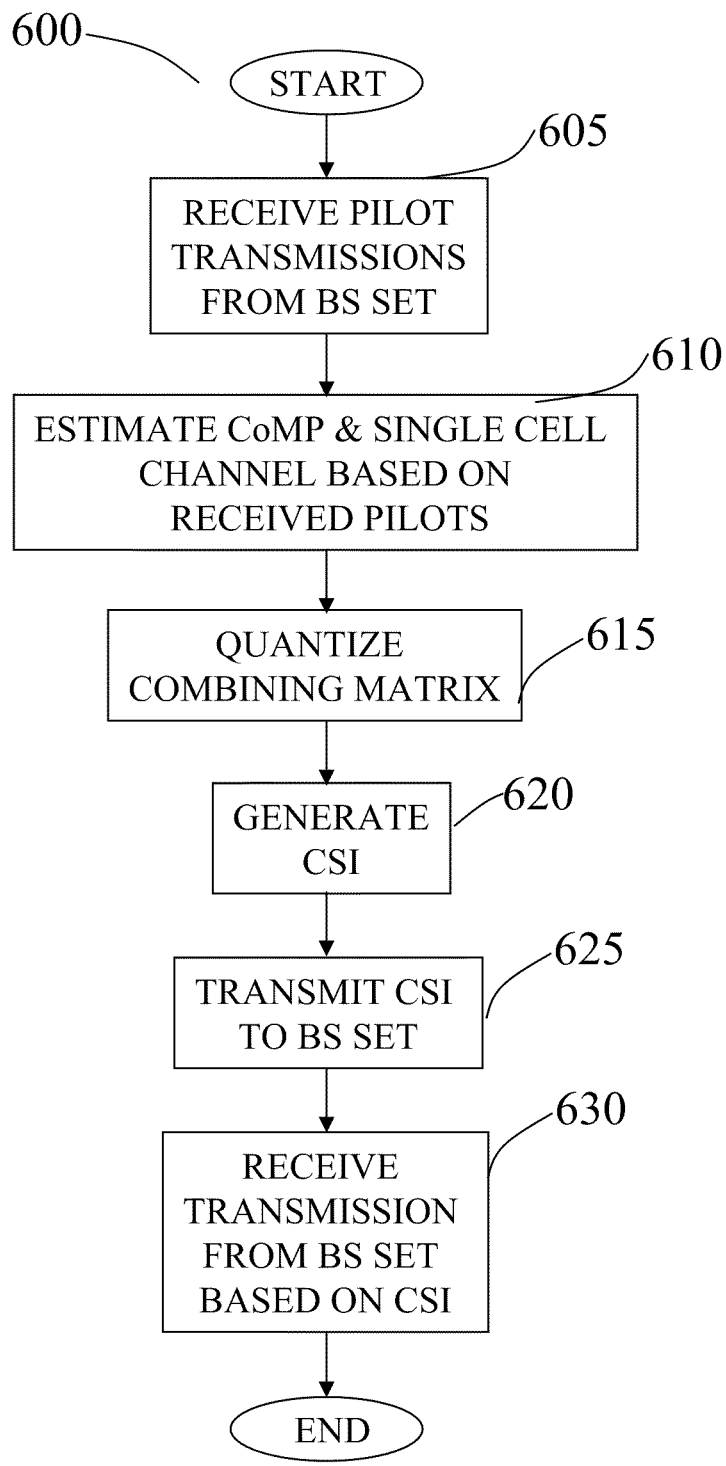
FIG. 5 illustrates a flow diagram of MS operations in providing feedback information to a BS for a CoMP communication in accordance with an alternate embodiment of the invention.
Figure 6:
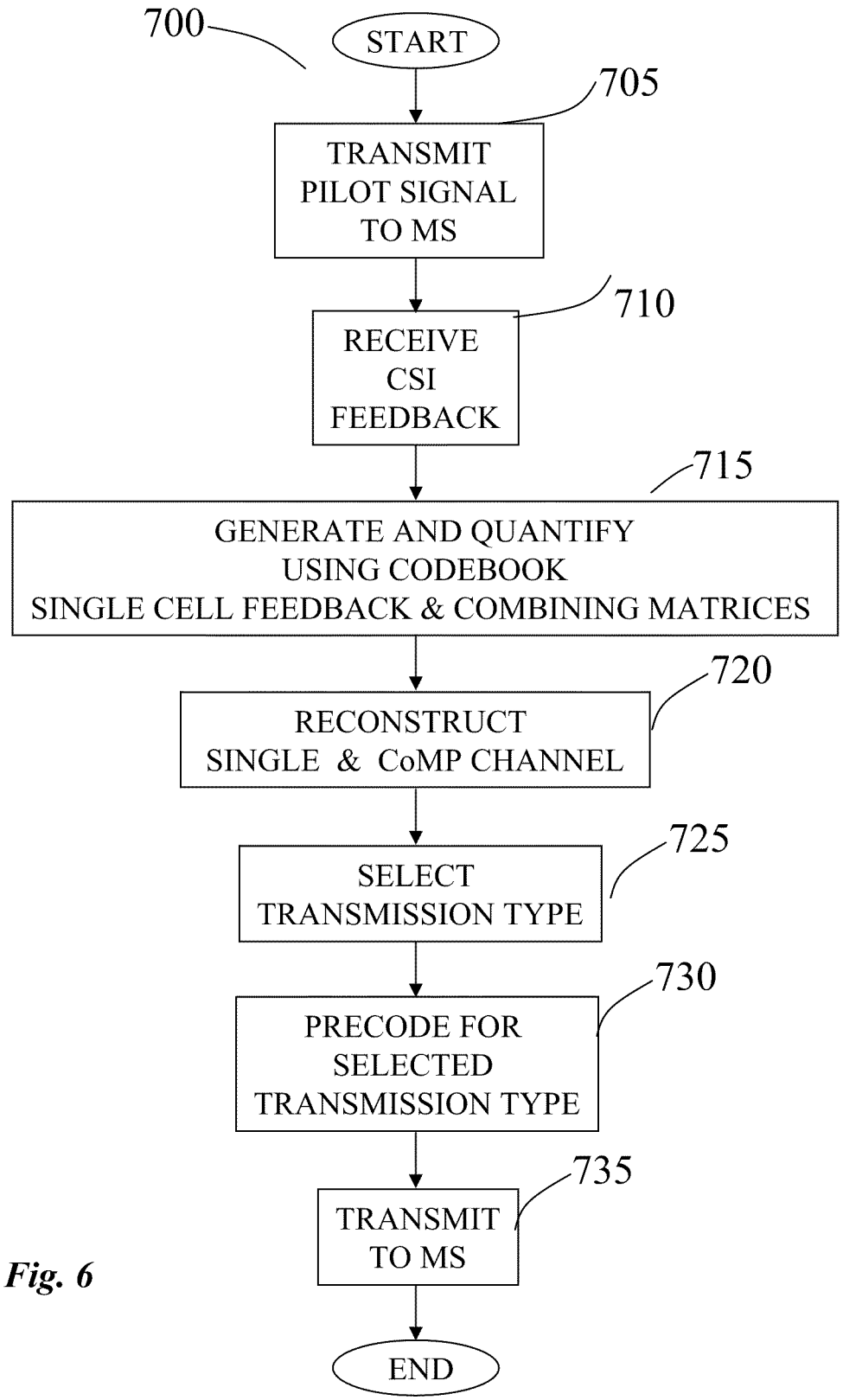
FIG. 6 illustrates a flow diagram of BS operations of a BS set serving a MS using CoMP communications in accordance with an alternate embodiment of the invention.

This alternative embodiment will now be described using FIGS. 5 and 6, which illustrate the operation of a mobile station (FIG. 5) and a base station (FIG. 6).

In embodiments using a codebook-based feedback, a codebook is stored at both the BS set and the MS in advance. The MS then follows certain rules to select the optimal combining matrix according to the current channel state and returns an index or indices of the common codebook, which indicates the selected optimal combining matrix to the BS. This method involves limited feedback and further improves feedback efficiency.

In various embodiments, any suitable design for codebook may be used. The codebook can be fixed or adaptive in various embodiments. While fixed codebooks are simpler to implement and require small feedback, fixed codebooks cannot be flexibly adapted to diversified scenarios and can be limiting as the codebook size increases. Furthermore, larger codebooks require more storage space, which may tax the storage capabilities of the transmitter and the receiver. Because the feedback channel constitutes system overhead, there is a tension between using more feedback overhead to obtain higher resolution and using less feedback to reduce the penalty due to feedback overhead.

Referring to FIG. 5, as in prior embodiments, MS operations 600 may begin with the MS receiving pilot signals from each of the BS in the BS set serving the MS (block 605). The MS estimates the downlink channel between each of the BS in the BS set serving the MS and the MS using the received pilot (block 610). From the estimate of the downlink channel, the MS computes the single cell CSI feedback matrix $V_i$ for an i-th downlink channel between an i-th base station of the plurality of base stations and the mobile station and an approximate combining matrix W(block 610).

In one embodiment, the MS determines the combining matrix W by computing $V(1:n)$, which is the first n significant singular vectors of the CoMP feedback matrix V (e.g., obtained after SVD of the CoMP channel). The MS further defines and defines a block diagonal matrix $$\begin{pmatrix} V_1(1:n_1) & & & \\ & V_2(1:n_2) & & \\ & & \ddots & \\ & & & V_K(1:n_K) \end{pmatrix}.$$

The combining matrix W is then defined as $$W = \begin{pmatrix} W_1 \\ W_2 \\ \vdots \\ W_K \end{pmatrix} = \begin{pmatrix} V_1(1:n_1) & & & \\ & V_2(1:n_2) & & \\ & & \ddots & \\ & & & V_K(1:n_K) \end{pmatrix}^H V(1:n).$$

As defined previously, K is the number of base stations, and $V_i(1:n_i)$ denotes the first $n_i$ columns of $V_i$. Hence, W is a unitary matrix and can be represented by a codebook, as described below.

In this embodiment, each $W_i$ can be rewritten as $$W_i = V_i^H(1:n_i) V\left(\sum_{k=1}^{i-1} N_{tk} : \sum_{k=1}^{i} N_{tk}, 1:n\right).$$

Hence, $$V\left(\sum_{k=1}^{i-1} N_{tk} : \sum_{k=1}^{i} N_{tk}, 1:n\right)$$

is a matrix having elements from row $$\sum_{k=1}^{i-1} N_{tk}$$

to row $$\sum_{k=1}^{i} N_{tk}$$

of the first n columns of matrix V.

In another embodiment, an equivalent channel $\tilde{H}$ for the CoMP channel H is defined as a summation of multiple single cell channels. Therefore $\tilde{H}$ is defined as $$\tilde{H} = \sum_{k=1}^{K} H_k V_k(1:n_k),$$

where $H_k$ is the single cell channel, and $V_k(1:n_k)$ is a matrix having the first $n_k$ columns of the corresponding single cell feedback matrix $V_k$.

After SVD ($\tilde{H}=\tilde{U}\tilde{D}\tilde{V}^H$), the MS determines a unitary combining matrix W $$W = \begin{pmatrix} W_1 \\ W_2 \\ \vdots \\ W_K \end{pmatrix} = \tilde{V}(1:n),$$

where $\tilde{V}(1:n)$ represents the first n columns of matrix $\tilde{V}$.

Again in this embodiment because the combining matrix W is defined as a unitary matrix, suitable codebook design may be selected and the feedback can be quantized.

The combining matrix W is a $n_w \times n$ matrix where $$n_w = \sum_{k=1}^{K} n_k.$$

However, available codebooks may be incompatible with this size. Hence, in various embodiments the dimension of the combining matrix W may be configured. In one embodiment, the dimension of W may be set such that $n_w=N$, wherein N is a predetermined number, for example, compatible with codebook design. The corresponding $n_k, i \in [1, \ldots, K]$ may then be configured as $\{n_1, \ldots, n_K\} = \arg(\max C(H, V_1(1:n_1), \ldots, V_K(1:n_K)))$, wherein $C(\bullet)$ is a predefined metric for the optimization. Shannon capacity is an example of a predefined metric in one embodiment. In various embodiments, other suitable metrics may be used.

The constraint $$\sum_{k=1}^{K} n_k = N,$$

N being a positive integer is applied to the above optimization thereby forcing the combining matrix to have a dimension of N×n compatible with a pre-selected codebook.

Based on a predetermined codebook between the MS and the BS, the MS selects an index of the codebook that best matches the current estimated combining matrix (block 615). The MS then generates a CSI information that includes information of the computed feedback matrices (block 620). The MS then feedbacks the generated CSI to the BS set (block 625). The MS receives a new transmission from the BS set based on the CSI feedback to the BS set (block 630).

Advantageously, the MS has flexibility on which of the $n_k$, which determines the size of the combining matrix, to be selected while forming the combining matrix. For example, in some embodiments, the MS may send information only for significant $n_k$.

FIG. 6 illustrates a flow diagram of BS operations 700 of a BS set serving a MS using CoMP communications in accordance with embodiments of the invention.

As in prior embodiments, BS operations 700 begin with the BS transmitting a pilot signal (block 705). After transmitting the pilot, the BS may receive channel information feedback from the MSs operating within its coverage area (block 710). The BS may receive information about the single cell feedback matrix $V_i$ and a combining matrix in various embodiments described. The BS generates the single cell feedback matrix $V_i$ and a combining matrix from the CSI, example, removing error decoding etc (block 715). The generation of the matrices may involve a look up from a predetermined codebook. For example, the MS may have quantized either or both the matrices.

As in prior embodiments, the BS uses the single cell feedback matrix $V_i$ and the combining matrix to generate the CoMP channel precoding matrix (block 720). In one embodiment, the BS computes the CoMP channel precoding matrix for the CoMP as $$V(1:n) = \begin{pmatrix} V_1(1:n_1) & & & \\ & V_2(1:n_2) & & \\ & & \ddots & \\ & & & V_K(1:n_K) \end{pmatrix} \begin{pmatrix} W_1 \\ W_2 \\ \vdots \\ W_K \end{pmatrix},$$

where $V(1:n)$ represents the first n columns of the CoMP channel precoding matrix V.

The BS selects a transmission mode (CoMP or conventional single cell MIMO) for the next transmission to the BS (block 725). This may be communicated to the BS by a gateway in some embodiments.

The data to be transmitted is precoded based on the channel feedback information (block 730). If the transmission mode is CoMP, the computed the CoMP channel precoding matrix for the beamforming. If the transmission mode is single cell MIMO, the single cell feedback matrix is used for the beamforming. The precoded data is transmitted to the MS (block 735).

In some embodiments, the BS or the serving BS overrides the mobile station and selects a subset of the BS for the next transmission to the MS. In such embodiments, a subset of base stations is first selected. The CoMP channel precoding matrix for each base station in the selected subset is calculated using a subset of the combining matrix W. Advantageously because the combining matrix is composite of different contributions, contributions from an individual channel can be conveniently removed. Hence, using a subset of the combining matrix, the BS (or an appropriate server) generates precoding matrices for transmission at each BS in the selected subset of the BS set. The data is then transmitted to the MS from the subset of base stations to the mobile station.

Figure 7:
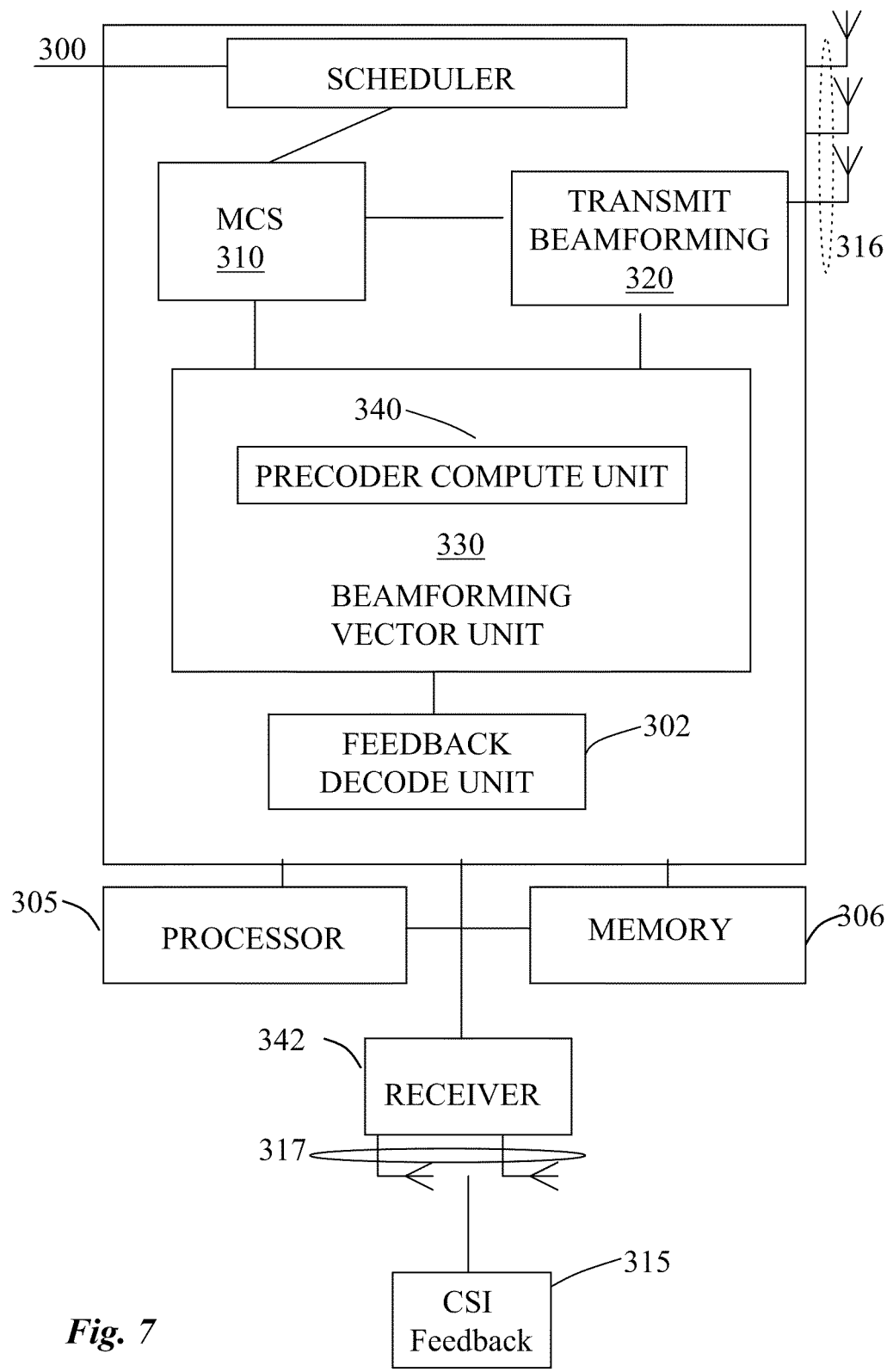
FIG. 7 illustrates a base station implementing embodiments of the invention.
Figure 8:
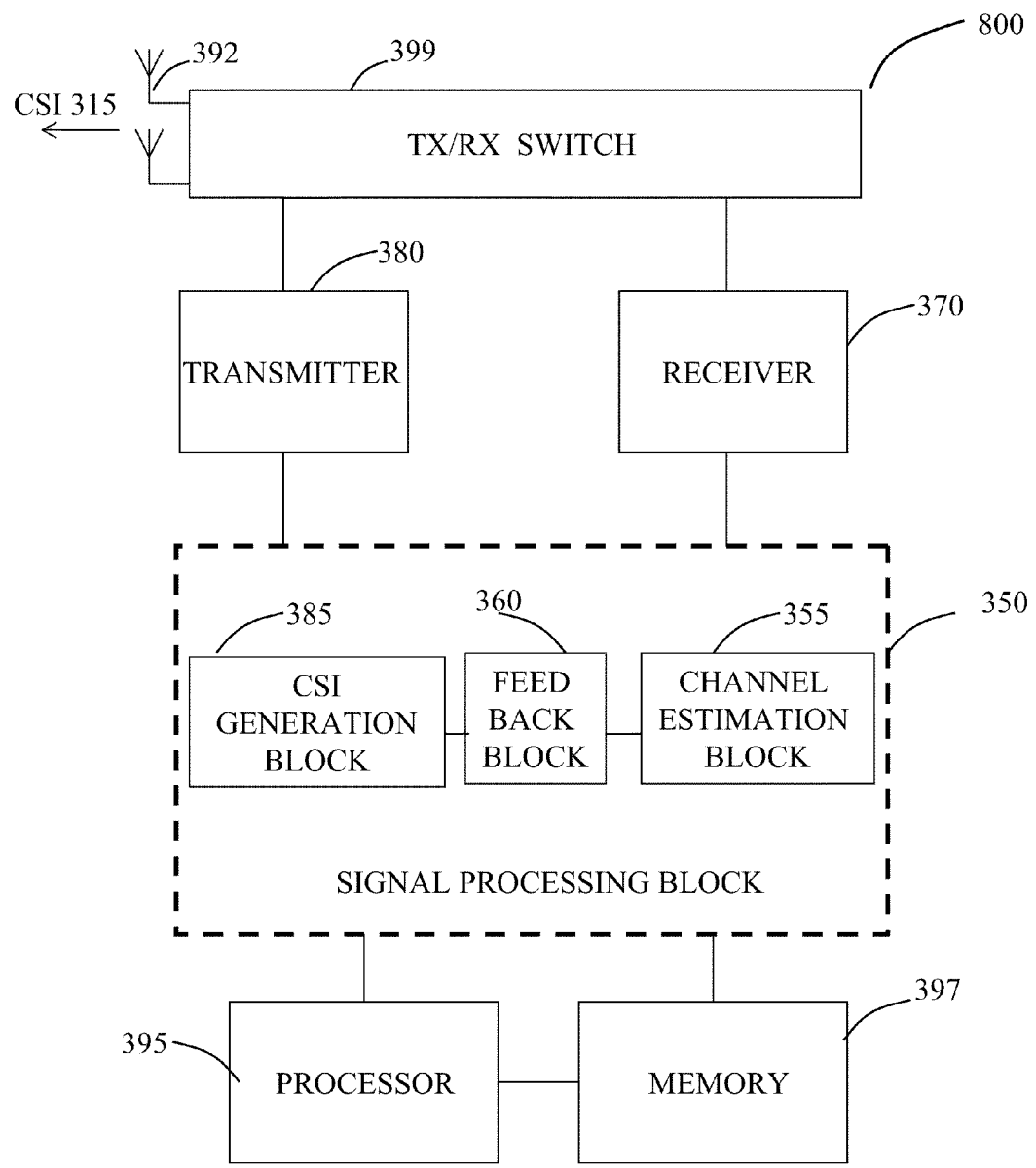
FIG. 8 illustrates a mobile station implementing embodiments of the invention.

FIGS. 7 and 8 illustrate communications devices implementing embodiments of the invention, wherein FIG. 7 illustrates a base station, and wherein FIG. 8 illustrates a mobile station.

FIG. 7 illustrates a BS such as BS 105 in FIGS. 1 and 2. A receiver 342 at the BS receives channel state information feedback 315 from a MS through a plurality of receive antennas 317. The channel state information feedback 315 may be transmitted by a MS in response to a pilot or a reference signal from the BS.

A feedback decode unit 302 decodes feedback information (the channel state information feedback 315) received from the MS. Decoding feedback information may involve the use of a codebook if channel state information feedback 315 was quantized using a codebook by the MS. The channel state information feedback 315 may be encoded to protect during the transmission. If so protected, feedback decode unit 302 may remove the encoding used to protect channel state information feedback 315 to produce feedback information.

Output of feedback decode unit 302, which includes channel measurement data, e.g., a single cell CSI and a combining matrix for CoMP, is provided to beamforming vector unit 330.

In various embodiments, beamforming vector unit 330 includes a precode compute unit 340. The precode compute unit 340 may be used to compute a precoder (beamforming vectors) for the MS. In various embodiments, the precode compute unit 340 computes a single cell precoding matrix if a single cell MIMO is scheduled by the scheduler 304. Alternatively, the precode compute unit 340 computes a CoMP channel precoding matrix if a CoMP transmission is scheduled.

Besides channel measurement data described, channel state information feedback 315, for purposes of illustration, may also include modulation, coding, and/or spatial formatting decisions, received signal strength, and signal-to-interference-plus-noise measurements. Channel state information feedback 315 may also be provided to a scheduler 304, which may use the information in its scheduling of MSs.

Data transmission operations within the BS are next described. Data 300, in the form of bits, symbols, or packets for example, destined for a plurality of MS, including a MS D 115 in FIG. 2, being served by the BS A is sent to a scheduler 304. The scheduler 304 decides which MSs will be transmitted to in a given time/frequency opportunity. For example, the scheduler 304 may select MS D 115 for transmission at a given time. The selection of the MSs may be based on factors such as maximizing throughput, service history, MS priority, information priority, and so forth.

Scheduler 304 may use any of the known scheduling disciplines in the literature including round robin, maximum sum rate, proportional fair, minimum remaining processing time, or maximum weighted sum rate; generally scheduling decisions may be based on channel state information feedback 315 received from the plurality of MSs being served. Scheduler 304 may decide to send information to a single MS via transmit beamforming, or may decide to serve multiple MSs simultaneously through MU-MIMO communications, or may decide (or directed by another server or BS) to serve a single MS through a CoMP transmission.

Data destined for the MS D 115 is processed by modulation and coding block 310 to convert to transmitted symbols and add redundancy for the purpose of assisting with error correction or error detection. The modulation and coding scheme may be chosen based in part on information about the channel state information feedback 315 and/or determined by scheduler 304.

Modulation and coding block 310 may perform any number of coding and modulation techniques including quadrature amplitude modulation, phase shift keying, frequency shift keying, differential phase modulation, convolutional coding, turbo coding, bit interleaved convolutional coding, low density parity check coding, fountain coding, or block coding.

The output of modulation and coding block 310 is passed to a transmit beamforming block 320, which maps the modulated and coded stream for the MS onto a beamforming vector. The beamformed outputs are coupled to antennas 316 through RF circuitry. The transmit beamforming vectors may be input from a beamforming vector unit 330, which may determine the transmit beamforming vectors based on the channel state information feedback 315 as well as information from scheduler 304, which may include information regarding the MS selected for transmission, and so on.

The BS may include a plurality of processors 305 and memory 306 to perform the above operations. The memory 306 includes both volatile and non-volatile memory used by the various components.

While not explicitly illustrated, it is obvious to those of ordinary skill in the art that OFDM modulation can be used. Further, any number of multiple access techniques could be used including orthogonal frequency division multiple access, code division multiple access, frequency division multiple access, or time division multiple access.

In various embodiments, the feedback decode unit 302 and the beamforming vector unit 330 may be implemented in hardware as a signal processing chip such as a digital signal processor. Alternatively, the feedback decode unit 302 and the beamforming vector unit 330 or parts thereof, may be implemented in software, wherein the software code is stored in a memory such as memory 306 and executed in a processor such as processor 305.

FIG. 8 illustrates MS 800, such as MS 115 in FIGS. 1 and 2, in accordance with embodiments of the invention. MS 800 may have one or more receive antennas 392, connecting through RF circuitry to a signal processing block 350. Antennas 392 may serve as both a transmit antennas and a receive antennas and operated through a TX/RX switch 399. Alternatively, MS 800 may have separate transmit and receive antennas. MS 800 may have equal numbers of transmit antennas and receive antennas or MS 800 may have a different number of transmit antennas and receive antennas. Coupled to antennas 392 may be a transmitter 380 used to transmit information over the air using antennas 392. Also coupled to antennas 392 may be a receiver 370 used to receive information detected by antennas 392.

The signal processing block 350 may include separate circuitry for the transmitting and the receiving side, but may also be integrated together as a single component in some embodiments. Examples of signal processing, on the receiving side, include filtering, amplifying, demodulating, error detecting and correcting, serial-to-parallel converting, de-interleaving, and so on. Examples of signal processing, on the transmitting side, include filtering, amplifying, modulating, error encoding, parallel-to-serial converting, interleaving, bit puncturing, and so forth.

The signal processing block 350 also includes a channel estimation block 355. The channel estimation block 355 may employ any number of algorithms known in the art including least squares, maximum likelihood, maximum a postiori, Bayes estimator, adaptive estimator, a blind estimator, or so forth, to estimate a channel between MS 350 and its serving BS. Some algorithms exploit known information inserted into the transmit signal in the form of training signals, training pilots, while others use structure in the transmitted signal such as cyclostationarity to estimate coefficients of the channel between the BS and the MS.

Feedback block 360 may be used to compute the single cell precoding matrix of the channel between MS 300 and its serving BS as well as the combining matrix for that channel. According to an embodiment, feedback block 360 may make use of singular value decomposition (SVD) for the computation of the single cell precoding matrix and the combining matrix, as described in detail above, from the channel estimate provided by channel estimation block 355.

In some embodiments, the amount of information feedback to the BS is quantized, for example, using a codebook. In such embodiments, channel state information produced from information provided by channel estimation block 355 is quantized using, for example, a quantization block (not shown). The quantization block quantizes the channel state information using a codebook. An index from the codebook may be output from the quantization block. In various embodiments, either or both the single cell CL-MIMO precoding matrix and the combining matrix may be quantized using separate code books. The feedback block 360 generates a new feedback message by combining the codebook indices output from quantization block.

The output of the feedback block 360 is given to the channel state information generation block 385, which generates a special feedback control message employing the outputs of feedback block 360 to produce channel state information feedback 315. The channel state information generation block 385 may also apply an error correcting code to protect information in the feedback message from errors.

The MS 800 may include a plurality of processors 395 and memory 397. The processors 395 may be a processing unit responsible for executing applications and programs, controlling operations of various components of the MS 800, interacting with base stations, relay nodes, and so forth. In addition to the above listed operations, processor 395 may be responsible for the processing required by the various units of the signal processing block 350 described above.

The processor 395 is coupled to the memory 397, which may also be used for storing applications and data, including information relating to the channel state information. The memory 397 may include both volatile and non-volatile memory used by the various components.

In various embodiments, the signal processing block 350 may be implemented in hardware as a signal processing chip such as a digital signal processor. Alternatively, the signal processing block 350 or parts thereof, may be implemented in software, wherein the software code is stored in a memory such as memory 397 and executed in a processor such as processor 395.

A number of features and advantages are provided with respect to embodiments of the present invention. For example, with the combining matrices, the single cell CSI feedback can be used to compose the CSI for joint processing/transmission CoMP.

Embodiments of the invention provide several advantages. In various embodiments, the beamforming information e.g., V(:,n) is directly obtained at the BS. Embodiments of the invention minimize backhaul CSI sharing across the BS set serving the MS. For example, the j-th BS, j≠i in the serving set does not need to share its CSI feedback of single cell feedback matrix and combining matrix with the i-th BS in the same set via the backhaul. In other words, the i-th BS only requires single cell feedback matrix and combining matrix fed back by MS for CoMP with fully joint processing.

In various embodiments, advantageously, a single CSI feedback from the MS is directly used for both single cell MIMO and coordinated scheduling/beamforming based CoMP. Thus embodiments of the invention eliminate the need to send separate feedbacks for single cell MIMO and coordinated scheduling/beamforming based CoMP.

Embodiments of the invention advantageously enable transparent mode adaptation between single cell and CoMP transmission. For example, if the uplink has enough capacity such that MS can feedback both the single cell feedback matrix and the combining matrix (or their quantized information) for each BS in the serving BS set, then CoMP with fully joint processing can be employed. If, on the other hand, the uplink is capacity limited and MS can only feedback the single cell feedback matrix, then a simpler form of CoMP (e.g., coordinated scheduling/beamforming) can be employed. In other words, mode adaptation between single cell and CoMP transmission can be adopted dynamically based on channel conditions.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for providing wireless communication system comprising:
   at a mobile station, receiving a reference signal from each base station of a plurality of base stations serving the mobile station;
   measuring each of the received reference signal to compute a single cell feedback matrix and a combining matrix for each channel between the plurality of base stations and the mobile station;
   generating a channel state information having information about the combining and the single cell feedback matrices; and
   transmitting the channel state information to the plurality of base stations, wherein the channel state information is a feedback for a single cell multiple input multiple output (MIMO) channel and a coordinated multi-point (CoMP) channel.

2. The method of claim 1, further comprising:
   at a base station, computing a single cell MIMO channel precoding matrix for the single cell MIMO channel between the base station and the mobile station based on the channel state information; and
   transmitting data from the base station to the mobile station, wherein the data transmitted to the mobile station is precoded using the computed single cell MIMO channel precoding matrix.

3. The method of claim 1, further comprising:
   at each base station of the plurality of base stations, computing a CoMP channel precoding matrix for the CoMP channel between the plurality of base stations and the mobile station based on the channel state information; and
   transmitting data from each base station of the plurality of base stations to the mobile station, wherein the data transmitted to the mobile station is precoded using the computed CoMP channel precoding matrix.

4. The method of claim 1, further comprising:
   at a first set of base stations of the plurality of base stations, computing a coordinated multi-point (CoMP) channel precoding matrix for the CoMP channel between the plurality of base stations and the mobile station based on the channel state information, wherein the plurality of base stations comprises the first set of base stations and a remaining second set of base station, wherein each set of base stations is defined as having at least one base station; and
   transmitting data from the first set of base stations to the mobile station, wherein the data transmitted to the mobile station is precoded using the computed CoMP channel precoding matrix.

5. The method of claim 1, wherein transmitting the channel state information comprises transmitting the combining matrix for each channel and the single cell feedback matrix to the plurality of base stations.

6. The method of claim 5, wherein at the base station of the plurality of base stations, a composite CSI feedback matrix $\hat{V}$ the CoMP channel is calculated as:

$\hat{V}=[V_1W_1;V_2W_2;\ldots;V_iW_i;\ldots;V_KW_K]$, wherein K is the total number of base stations in the plurality of base stations, wherein $V_i$ is the single cell feedback matrix for an i-th channel between a i-th base station of the plurality of base stations and the mobile station, and wherein $W_i$, is the combining matrix for the i-th channel.

7. The method of claim 1, wherein the combining matrix for a i-th downlink channel $W_i$ between an i-th base station of the plurality of base stations and the mobile station is defined such that $W_i^H = \tilde{U}_i \tilde{D}_i$, wherein $\tilde{U}_i$ is a unitary matrix of eigenvectors for an i-th transformed downlink channel matrix $\tilde{H}_i$, wherein $\tilde{D}_i$ is a diagonal matrix for the i-th transformed downlink channel matrix $\tilde{H}_i$, wherein $\tilde{U}_i$ and $\tilde{D}_i$ are obtained from singular value decomposition of $\tilde{H}_i$, wherein the transformed downlink channel is $\tilde{H}_i = U^H H_i$, wherein $H_i$ is the i-th downlink channel, and wherein $U^H$ is a conjugate transpose of the unitary matrix of a CoMP downlink channel H between the plurality of base stations and the mobile station.

8. The method of claim 7, further comprising, at the base station, calculating a CoMP channel precoding matrix V for the CoMP downlink channel H as $$\text{norm}([W_1^H \tilde{V}_1^H, W_2^H \tilde{V}_2^H, \ldots, W_i^H \tilde{V}_i^H \ldots, W_K^H \tilde{V}_K^H]) = \text{norm}(DV^H) = V^H,$$

wherein $V_i$, is the single cell feedback matrix for the i-th downlink channel between a i-th base station of the plurality of base stations and the mobile station, wherein $W_i$, is the combining matrix for the i-th downlink channel, and wherein D is a diagonal matrix for the CoMP downlink channel H.

9. The method of claim 7, wherein the combining matrix $W_i$ for the i-th downlink channel is defined such that $$W_i^H = [\tilde{u}_{i1}, \tilde{u}_{i2}, \ldots, \tilde{u}_{iN_r}] \times \begin{bmatrix} \lambda_{i1} & 0 & \ldots & 0 \\ 0 & \lambda_{i2} & \ldots & 0 \\ \vdots & \vdots & \ddots & \vdots \\ 0 & 0 & \ldots & \lambda_{iN_r} \end{bmatrix}.$$

10. The method of claim 7, wherein the combining matrix $W_i$ for the i-th downlink channel is defined such that only singular values in $\tilde{D}_i$ above a predetermined threshold are included, wherein $\tilde{D}_i$ is the diagonal matrix for the i-th transformed downlink channel $\tilde{H}_i$.

11. The method of claim 7, wherein the combining matrix $W_i^H$ is defined as $$\tilde{W}_i^H = [\tilde{u}_{i1}, \tilde{u}_{i2}, \ldots, \tilde{u}_{im_i}] \times \begin{bmatrix} \lambda_{i1} & 0 & \ldots & 0 \\ 0 & \lambda_{i2} & \ldots & 0 \\ \vdots & \vdots & \ddots & \vdots \\ 0 & 0 & \ldots & \lambda_{im_i} \end{bmatrix} = W_i(1:m_i, :)^H,$$

wherein $m_i \in [1, \ldots, N_r]$, and
wherein $N_r$ is the number of antennas on the mobile station, $\lambda_{im_i}$ is the $m_i$-th strongest singular value of $\tilde{H}_i$.

12. The method of claim 1, wherein the combining matrix W is defined as a unitary matrix, wherein generating a channel state information comprises quantizing the combining matrix using a predetermined codebook.

13. The method of claim 12, wherein the combining matrix W is defined as $$W = \begin{pmatrix} W_1 \\ W_2 \\ \vdots \\ W_K \end{pmatrix} = \begin{pmatrix} V_1(1:n_1) & & & \\ & V_2(1:n_2) & & \\ & & \ddots & \\ & & & V_K(1:n_K) \end{pmatrix}^H V(1:n),$$

wherein K is the number of base stations, and $V_i(1:n_i)$ is the first $n_i$ columns of the single cell feedback matrix, wherein $W_i$ is the combining matrix for each channel, and wherein $V(1:n)$ is the first n significant singular vectors of a coordinated multi-point CoMP feedback matrix.

14. The method of claim 13, wherein combining matrix for a i-th downlink channel $W_i$ between an i-th base station of the plurality of base stations and the mobile station is defined as $$W_i = V_i^H(1:n_i) V\left(\sum_{k=1}^{i-1} N_{tk} : \sum_{k=1}^{i} N_{tk}, 1:n\right),$$

wherein $$V\left(\sum_{k=1}^{i-1} N_{tk} : \sum_{k=1}^{i} N_{tk}, 1:n\right)$$

is a matrix having elements from row $$\sum_{k=1}^{i-1} N_{tk} \text{ to row } \sum_{k=1}^{i} N_{tk}$$

of the first n columns of matrix V.

15. The method of claim 13, wherein the mobile station configures the combining matrix to have a dimension of N×n by selecting $n_k$, $i \in [1, \ldots, K]$ having a constraint $$\sum_{k=1}^{K} n_k = N.$$

16. The method of claim 13, wherein at the base station of the plurality of base stations, a coordinated multi-point (CoMP) channel precoding matrix V(1:n) is computed as:

$$V(1:n) = \begin{pmatrix} V_1(1:n_1) & & & \\ & V_2(1:n_2) & & \\ & & \ddots & \\ & & & V_K(1:n_K) \end{pmatrix} \begin{pmatrix} W_1 \\ W_2 \\ \vdots \\ W_K \end{pmatrix}.$$

17. The method of claim 13, further comprising:
selecting a subset of base stations from the plurality of base stations;
calculating a corresponding CoMP channel precoding matrix using a subset of the combining matrix W; and
transmitting data from the subset of base stations to the mobile station, wherein the data transmitted to the mobile station is precoded using the computed CoMP channel precoding matrix computed using the subset of the combining matrix W.

18. The method of claim 12, wherein the combining matrix W is defined as $$W = \begin{pmatrix} W_1 \\ W_2 \\ \vdots \\ W_K \end{pmatrix} = \tilde{V}(1:n),$$

wherein $\tilde{V}(1:n)$ is the first n columns of matrix $\tilde{V}$, wherein $\tilde{V}$ is a feedback matrix obtained from the singular value decomposition ($\tilde{H}=\tilde{U}\tilde{D}\tilde{V}^H$) of an equivalent channel matrix $\tilde{H}$, wherein the equivalent channel matrix $\tilde{H}$ is defined as $$\tilde{H} = \sum_{k=1}^{K} H_k V_k(1:n_k),$$

wherein $H_k$ is a single cell channel, and $V_k(1:n_k)$ is a matrix having the first $n_k$ columns of the corresponding single cell feedback matrix $V_k$.

19. A communication device comprising:
a receiver configured to receive reference signals;
a channel estimate unit configured to measure the received reference signals;
a feedback unit configured to compute a single cell feedback matrix and a combining matrix for each channel between a plurality of base stations and the communication device;
a channel state information generation unit configured to generate a channel state information having information about the combining and the single cell feedback matrices, wherein the cahnnel state information is a feedback for a single cell multiple input multiple output (MIMO) channel and a coordinated multi-point (CoMP) channel; and
a transmitter configured to transmit the channel state information to the plurality of base stations.

20. The communication device of claim 19, wherein the combining matrix for a i-th downlink channel $W_i$ is defined such that $W_i^H = \tilde{U}_i \tilde{D}_i$, wherein $\tilde{U}_i$ is a unitary matrix of eigenvectors for an i-th transformed downlink channel matrix $\tilde{H}_i$, wherein $\tilde{D}_i$ is a diagonal matrix for the i-th transformed downlink channel matrix $\tilde{H}_i$, wherein $\tilde{U}_i$ and $\tilde{D}_i$ are obtained from singular value decomposition of $\tilde{H}_i$, wherein the transformed downlink channel is $\tilde{H}_i = U^H H_i$, wherein $H_i$ is the i-th downlink channel between an i-th base station of the plurality of base stations and the communication device, and wherein $U^H$ is a conjugate transpose of the unitary matrix of a CoMP downlink channel H between the plurality of base stations and the communication device.

21. The communication device of claim 20, wherein the combining matrix $W_i$ for the i-th downlink channel is defined such that $$W_i^H = [\tilde{u}_{i1}, \tilde{u}_{i2}, \ldots, \tilde{u}_{iN_r}] \times \begin{bmatrix} \lambda_{i1} & 0 & \cdots & 0 \\ 0 & \lambda_{i2} & \cdots & 0 \\ \vdots & \vdots & \ddots & \vdots \\ 0 & 0 & \cdots & \lambda_{iN_r} \end{bmatrix}.$$

22. The communication device of claim 20, wherein the combining matrix $W_i$ for the i-th downlink channel is defined such that only singular values in $\tilde{D}_i$ above a predetermined threshold are included, wherein $\tilde{D}_i$ is the diagonal matrix for the i-th transformed downlink channel $\tilde{H}_i$.

23. The communication device of claim 20, wherein the combining matrix $W_i^H$ is defined as $$W_i^H = [\tilde{u}_{i1}, \tilde{u}_{i2}, \ldots, \tilde{u}_{im_i}] \times \begin{bmatrix} \lambda_{i1} & 0 & \cdots & 0 \\ 0 & \lambda_{i2} & \cdots & 0 \\ \vdots & \vdots & \ddots & \vdots \\ 0 & 0 & \cdots & \lambda_{im_i} \end{bmatrix} = W_i(1:m_i,:)^H,$$

wherein $m_i \in [1, \ldots, N_r]$, and wherein $N_r$ is the number of antennas on the communication device.

24. The communication device of claim 19, wherein the combining matrix (W) is defined as $$W = \begin{pmatrix} W_1 \\ W_2 \\ \vdots \\ W_K \end{pmatrix} = \begin{pmatrix} V_1(1:n_1) & & & \\ & V_2(1:n_2) & & \\ & & \ddots & \\ & & & V_K(1:n_K) \end{pmatrix}^H V(1:n),$$

wherein K is the number of base stations, and $V_i(1:n_i)$ is the first $n_i$ columns of the single cell feedback matrix, and wherein $V(1:n)$ is the first n significant singular vectors of a coordinated multi-point CoMP feedback matrix.

25. The communication device of claim 24, wherein the combining matrix for a i-th downlink channel $W_i$ between an i-th base station of the plurality of base stations and the communication device is defined as $$W_i = V_i^H(1:n_i) V\left(\sum_{k=1}^{i-1} N_{tk} : \sum_{k=1}^{i} N_{tk}, 1:n\right),$$

wherein $$V\left(\sum_{k=1}^{i-1} N_{tk} : \sum_{k=1}^{i} N_{tk}, 1:n\right)$$

is a matrix having elements from row $$\sum_{k=1}^{i-1} N_{tk} \text{ to row } \sum_{k=1}^{i} N_{tk}$$

of the first n columns of the CoMP channel feedback matrix V.

26. The communication device of claim 19, wherein the combining matrix W is defined as $$W = \begin{pmatrix} W_1 \\ W_2 \\ \vdots \\ W_K \end{pmatrix} = \tilde{V}(1:n),$$

wherein $\tilde{V}(1:n)$ is the first n columns of matrix $\tilde{V}$, wherein $\tilde{V}$ is a feedback matrix obtained from the singular value decomposition ($\tilde{H}=\tilde{U}\tilde{D}\tilde{V}^H$) of an equivalent channel matrix $\tilde{H}$, wherein the equivalent channel matrix $\tilde{H}$ is defined as $$\tilde{H} = \sum_{k=1}^{K} H_k V_k(1:n_k),$$

wherein $H_k$ is a single cell MINO channel, and $V_k(1:n_k)$ is a matrix having the first $n_k$ columns of the corresponding single cell feedback matrix $V_k$.

27. A communication device comprising:
- a receiver configured to receive channel state information comprising a single cell feedback matrix and a combining matrix;
- a precoder computer unit configured to compute a coordinated multi-point transmission (CoMP) channel precoding matrix for a coordinated multi-point transmission from the single cell feedback matrix and a combining matrix; and
- a transmitter configured to transmit a CoMP transmission with data precoded using the CoMP channel precoding matrix.

28. The communication device of claim 27, wherein the precoder computer unit is configured to compute the CoMP channel precoding matrix as:
$\hat{V}=[V_1 W_1; V_2 W_2; \ldots; V_i W_i; \ldots; V_K W_K]$, wherein K is the total number of base stations in the plurality of base stations, wherein $V_i$, is the single cell feedback matrix for an i-th channel between a i-th base station of the plurality of base stations and a mobile station, and wherein $W_i$, is the combining matrix for the i-th channel.

29. The communication device of claim 27, wherein the precoder computer unit is configured to compute the CoMP channel precoding matrix V for a CoMP downlink channel H as $\mathrm{norm}([W_1^H \tilde{V}_1^H, W_2^H \tilde{V}_2^H, \ldots, W_i^H \tilde{V}_i^H \ldots, W_K^H \tilde{V}_K^H])=\mathrm{norm}(DV^H)=V^H$, wherein $V_i$, is the single cell feedback matrix for the i-th downlink channel between a i-th base station of the plurality of base stations and a mobile station, wherein $W_i$, is the combining matrix for the i-th downlink channel, and wherein D is a diagonal matrix for the CoMP downlink channel H.

30. The communication device of claim 27, wherein the coordinated multi-point transmission (CoMP) channel precoding matrix is computed as:

$$V(1:n) = \begin{pmatrix} V_1(1:n_1) & & & \\ & V_2(1:n_2) & & \\ & & \ddots & \\ & & & V_K(1:n_K) \end{pmatrix} \begin{pmatrix} W_1 \\ W_2 \\ \vdots \\ W_K \end{pmatrix},$$

wherein K is the number of base stations, and $V_i(1:n_i)$ is the first $n_i$ columns of the single cell feedback matrix, wherein $W_i$ is the combining matrix for each channel, and wherein $V(1:n)$ is the first n columns of a coordinated multi-point CoMP feedback matrix.

* * * * *

UNITED STATES PATENT AND TRADEMARK OFFICE
CERTIFICATE OF CORRECTION

PATENT NO. : 8,600,308 B2  
APPLICATION NO. : 12/817003  
DATED : December 3, 2013  
INVENTOR(S) : Yang Tang et al.

Page 1 of 1

It is certified that error appears in the above-identified patent and that said Letters Patent is hereby corrected as shown below:

In the Claims

In Col. 17, line 2, claim 6, after "matrix $\hat{V}$" insert --for--.

In Col. 21, line 6, claim 26, delete "MINO channel" and insert --MIMO channel--.

Signed and Sealed this  
Fourth Day of March, 2014

Michelle K. Lee  
*Deputy Director of the United States Patent and Trademark Office*